(12) United States Patent
Schliwa-Bertling et al.

(10) Patent No.: US 10,383,127 B2
(45) Date of Patent: *Aug. 13, 2019

(54) METHODS AND NODES FOR TRANSFERRING A SERVICE IDENTIFIER FROM A PACKET CORE NETWORK TO A RADIO NETWORK

(71) Applicants: Telefonaktiebolaget LM Ericsson (publ), Stockholm (SE); China Mobile Communications Corporation, Beijing (CN)

(72) Inventors: Paul Schliwa-Bertling, Ljungsbro (SE); Jens Bergqvist, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/795,767

(22) Filed: Oct. 27, 2017

(65) Prior Publication Data

US 2018/0070350 A1  Mar. 8, 2018

Related U.S. Application Data

(63) Continuation of application No. 13/823,157, filed as application No. PCT/SE2011/050906 on Jul. 5, 2011, now Pat. No. 9,832,777.

(60) Provisional application No. 61/387,067, filed on Sep. 28, 2010.

(51) Int. Cl.
*H04W 72/04* (2009.01)
*H04L 12/857* (2013.01)
(Continued)

(52) U.S. Cl.
CPC ....... *H04W 72/048* (2013.01); *H04L 47/2491* (2013.01); *H04W 28/10* (2013.01); *H04L 47/14* (2013.01); *H04L 47/2441* (2013.01)

(58) Field of Classification Search
CPC ..... H04W 72/048; H04W 28/10; H04W 8/26; H04W 72/04; H04W 76/02; H04W 88/16;
(Continued)

(56) References Cited

U.S. PATENT DOCUMENTS 6,317,421 B1 * 11/2001 Wilhelmsson .......... H04L 29/06
370/328
2007/0105544 A1 * 5/2007 Veres .................... H04W 24/08
455/423

(Continued)

FOREIGN PATENT DOCUMENTS

CN          101588570 A     11/2009
WO    WO 2004/036849 A2     4/2004

OTHER PUBLICATIONS

International Search Report, PCT/SE2011/050906, dated Dec. 13, 2011.

(Continued)

*Primary Examiner* — Hardikkumar D Patel
(74) *Attorney, Agent, or Firm* — Sage Patent Group (57) ABSTRACT

A method in a in a Base Station Subsystem (BSS) for receiving a service identifier from a packet core network is provided. The BSS receives a service identifier in a BSS General Packet Radio Service (GPRS) Protocol (BSSGP) Downlink unitdata Protocol Data Unit (DL-UNITDATA PDU) that includes a Logical Link Control (LLC) PDU comprising a data packet or a portion of a data packet from a Serving General packet radio service Support Node (SGSN) which service identifier is identifying a type of service for the data packet, wherein receiving the service identifier in the DL-UNITDATA PDU comprises receiving, within a header of the DL-UNITDATA PDU, a value corresponding to the service identifier. The BSS performs an action based on the service identifier.

12 Claims, 8 Drawing Sheets

(51) Int. Cl.
*H04W 28/10* (2009.01)
*H04L 12/801* (2013.01)
*H04L 12/851* (2013.01)

(58) Field of Classification Search
CPC ... H04W 88/18; H04W 92/02; H04W 92/045; H04W 92/06; H04W 92/12; H04W 24/08; H04W 88/02; H04W 76/021; H04W 80/04; H04W 76/028; H04W 76/022; H04L 47/2491; H04L 47/14; H04L 47/2441; H04L 63/02; H04L 63/024; H04L 29/06; H04L 9/00; H04L 63/0272; H04L 63/0428; H04L 63/105; H04L 63/20; H04L 12/56; H04L 69/32; H04L 69/324; H04L 41/0896; H04L 41/5022; H04L 41/5067; H04L 29/12207; H04L 29/12783; H04L 41/5003; H04L 61/20; H04L 61/35; H04L 12/26; H04Q 7/22; H04Q 7/30; H04Q 7/20; H04J 3/1694
See application file for complete search history.

(56) References Cited

U.S. PATENT DOCUMENTS

2007/0127487 A1    6/2007   Kim et al.
2008/0276085 A1*  11/2008   Davidson ............ H04L 63/0272
                                                          713/161

OTHER PUBLICATIONS

Written Opinion of the International Searching Authority, PCT/SE2011/050906, dated Dec. 13, 2011.
Written Opinion of the International Searching Authority, PCT/SE2011/050906, dated Aug. 21, 2012.
International Preliminary Report on Patentability, PCT/SE2011/050906, dated Oct. 25, 2012.
Chinese Office Action corresponding to Application No. 201180046758.3, dated Jul. 23, 2015, along with English translation (20 pages).
Chinese Office Action corresponding to Application No. 201180046758.3, dated Jan. 26, 2016, along with English translation (10 pages).
European Examination Report Corresponding to Application No. 11 770 913.9; dated Sep. 30, 2016; 5 Pages.

* cited by examiner

METHODS AND NODES FOR TRANSFERRING A SERVICE IDENTIFIER FROM A PACKET CORE NETWORK TO A RADIO NETWORK

CROSS-REFERENCE TO RELATED APPLICATIONS

This application is a continuation of U.S. application Ser. No. 13/823,157, which claims the benefits under 35 U.S.C. § 119(e) of U.S. Provisional Patent Application No. 61/387,067 filed Sep. 28, 2010 and 35 U.S.C. § 365 of International Patent Application No. PCT/SE2011/050906 filed Jul. 5, 2011, the disclosures of which are hereby incorporated by reference herein in their entirety.

TECHNICAL FIELD

Embodiments herein relate to a Gateway General packet radio service Support Node, GGSN, and to a method in a GGSN.

Embodiments herein further relate to a Serving General packet radio service Support Node, SGSN, and to a method in a SGSN.

Embodiments herein further relate to a Base Station Subsystem, BSS, and to a method in a BSS. In particular, embodiments herein relate to transferring a service identifier from a packet core network to a radio network.

BACKGROUND

In a typical telecommunications system, also referred to as a wireless communication system, User Equipments (UEs), communicate via a Radio Access Network (RAN) to one or more Core Networks (CNs).

A user equipment is a terminal by which a subscriber can access services offered by an operator's core network. The user equipments, sometimes also referred to as Mobile Stations (MS) may be for example communication devices such as mobile telephones, cellular telephones, laptops or tablet computers, sometimes referred to as surf plates, with wireless capability. The user equipments may be portable, pocket-storable, hand-held, computer-comprised, or vehicle-mounted mobile devices, enabled to communicate voice and/or data, via the radio access network, with another entity, such as another mobile station or a server. A user equipment may also be stationary devices or machines that communicate via the RAN.

User equipments are enabled to communicate wirelessly in the telecommunications system. The communication may be performed e.g. between two user equipments, between a user equipment and a regular telephone and/or between the user equipment and a server via the radio access network and possibly one or more core networks, comprised within the telecommunications system.

The telecommunications system covers a geographical area which is divided into cell areas. Each cell area is served by a base station, which sometimes may be referred to as e.g. a Radio Base Station (RBS), or a BTS (Base Transceiver Station), depending on the technology and terminology used.

The base stations may be of different classes such as e.g. macro base station or pico base station, based on transmission power and thereby also on cell size.

A cell is the geographical area where radio coverage is provided by the base station at a base station site. One base station, situated on the base station site, may serve one or several cells. Further, each base station may support one or several communication technologies.

The base stations communicate over the air interface operating on radio frequencies with the user equipments within range of the base stations.

In some radio access networks, sometimes referred to as a radio network, several base stations may be connected, e.g. by landlines or microwave, to a radio network controller, e.g. a Radio Network Controller (RNC) in Universal Mobile Telecommunications System (UMTS), and/or to each other.

The radio network controller, also sometimes termed a Base Station Controller (BSC) e.g. in GSM, may supervise and coordinate various activities of the plural base stations connected thereto. GSM is an abbreviation for Global System for Mobile Communications (originally: Groupe Spécial Mobile).

In 3rd Generation Partnership Project (3GPP) Long Term Evolution (LTE), base stations, which may be referred to as eNodeBs or eNBs, may be directly connected to one or more core networks.

UMTS is a third generation, 3G, mobile communication system, which evolved from the second generation, 2G, mobile communication system GSM, and is intended to provide improved mobile communication services based on Wideband Code Division Multiple Access (WCDMA) access technology. UMTS Terrestrial Radio Access Network (UTRAN) is essentially a radio access network using WCDMA for user equipments. The 3GPP has undertaken to evolve further the UTRAN and GSM based radio access network technologies.

A Base Station Subsystem (BSS) which will be referred to in this disclosure is an example of a radio network, and is sometimes also referred to as a base station system.

The BSS comprises BSS nodes, such as a BSC and one or several BTSs.

General Packet Radio Services (GPRS) and Evolved GPRS (EGPRS) refer to platforms for packet orientated mobile services, wherein data is sent in so called data packets between the various nodes in the telecommunications system.

GPRS is a best-effort service, implying variable throughput and latency that depend on the number of mobile stations using the service concurrently.

The concept of Quality of Service (QoS) provides means for provisioning the BSS with a set of attributes that should be used to describe a service to achieve efficient resource utilization while maintaining the end to end service requirements.

The number of services utilizing GSM EGPRS networks is constantly increasing since the introduction of the so called smart phone. The services characteristics impose different requirements on the RAN to ensure efficient resource utilization while at the same time ensuring the differentiation between the user equipments on shared resources such as the Packet Data Channels (PDCH). With the introduction of different Machine Type Communication (MTC) devices that run services through the GSM EGPRS networks, the service characteristics that are required will be even more differentiated. MTC is seen as a form of data communication which involves one or more entities that do not necessarily need human interaction.

A problem is however, that the large multiplicity of services and the limitation of the QoS attributes limit the possibilities provided by the QoS concept.

SUMMARY

In view of the discussion above, it is an object for embodiments herein to provide a way of facilitating radio resource management in a telecommunications system providing packet based services.

According to a first aspect, the object is achieved by a method in a Gateway General packet radio service Support Node, GGSN, for transferring a service identifier from a packet core network to a radio network. The GGSN adds a service identifier in a General packet radio service Tunneling Protocol for User Plane, GTP-U, header extension of a data packet. The service identifier comprises information about what service and/or traffic pattern that the packet concerns. The GGSN sends the data packet with the GTP-U header extension to a radio network.

According to a second aspect, the object is achieved by a GGSN for transferring a service identifier from a packet core network to a radio network. The GGSN comprises an adding unit. The adding unit is configured to add a service identifier in a GTP-U header extension of a data packet. The service identifier comprises information about what service and/or traffic pattern that the packet concerns. The GGSN further comprises a sending unit. The sending unit is configured to send the data packet with the GTP-U header extension to a radio network.

According to a third aspect, the object is achieved by a method in a Serving General packet radio service Support Node, SGSN, for transferring a service identifier from a packet core network to a radio network. The radio network is a Base Station Subsystem, BSS. The SGSN receives a service identifier in a GTP-U header extension of a data packet from a GGSN. The service identifier is related to a traffic pattern and/or to a type of service for the data packet. The SGSN maps the service identifier to an information element in a DownLink unitdata Protocol Data Unit, DL-UNITDATA PDU, of a message containing the data packet. The SGSN transfers the service identifier in the DL-UNITDATA PDU to the BSS.

According to a fourth aspect, the object is achieved by a SGSN for transferring a service identifier from a packet core network to a radio network. The radio network is a Base Station Subsystem, BSS. The SGSN comprises a receiver. The receiver is configured to receive a service identifier in a GTP-U header extension of a data packet from a GGSN. The service identifier is related to a traffic pattern and/or to a type of service for the data packet. The SGSN comprises a mapping unit. The mapping unit is configured to map the service identifier to an information element in a DL-UNITDATA PDU of a message containing the data packet. The SGSN further comprises a transferring unit. The transferring unit is configured to transfer the service identifier in the DL-UNITDATA PDU to the BSS.

According to a fifth aspect, the object is achieved by a method in a Base Station Subsystem, BSS, for receiving a service identifier from a packet core network. The BSS receives a service identifier in a DL-UNITDATA PDU of a message containing a data packet from a SGSN. The service identifier is related to a traffic pattern and/or to a type of service for the data packet.

According to a sixth aspect, the object is achieved by a BSS for receiving a service identifier from a packet core network. The BSS comprises a receiver. The receiver is configured to receive a service identifier in a DL-UNITDATA PDU of a message containing a data packet from a SGSN. The service identifier is related to a traffic pattern and/or to a type of service for the data packet.

Since the service requirements for the different MTC devices will typically differ a lot depending on the type of MTC service or device in question, the desired radio resource management behavior will differ since the traffic pattern will differ a lot.

Since there will be a vast number of, likely different, MTC devices in the networks, there will be a need to reduce the amount of resources that are used for many of those devices or services whereas high performance at the same time shall be achieved for e.g. smart phone users.

Thanks to the service identifier becoming available in the radio network, it is possible to indicate certain known traffic patterns to the radio network which could be used to avoid overprovisioning of the resources.

The service identifier, indicating the traffic pattern and/or characteristics for the service that is being transferred, can for instance be used to determine what type of and/or what amount of radio resources that shall be allocated to the user equipment. It can also e.g. be used to determine for how long radio resources shall be kept when the data flow has terminated, to wait for more data. This is especially important with the introduction of Machine Type of Communication devices.

Hence, radio resource management in a telecommunications system providing packet based services is facilitated.

DETAILED DESCRIPTION

Figure 1:
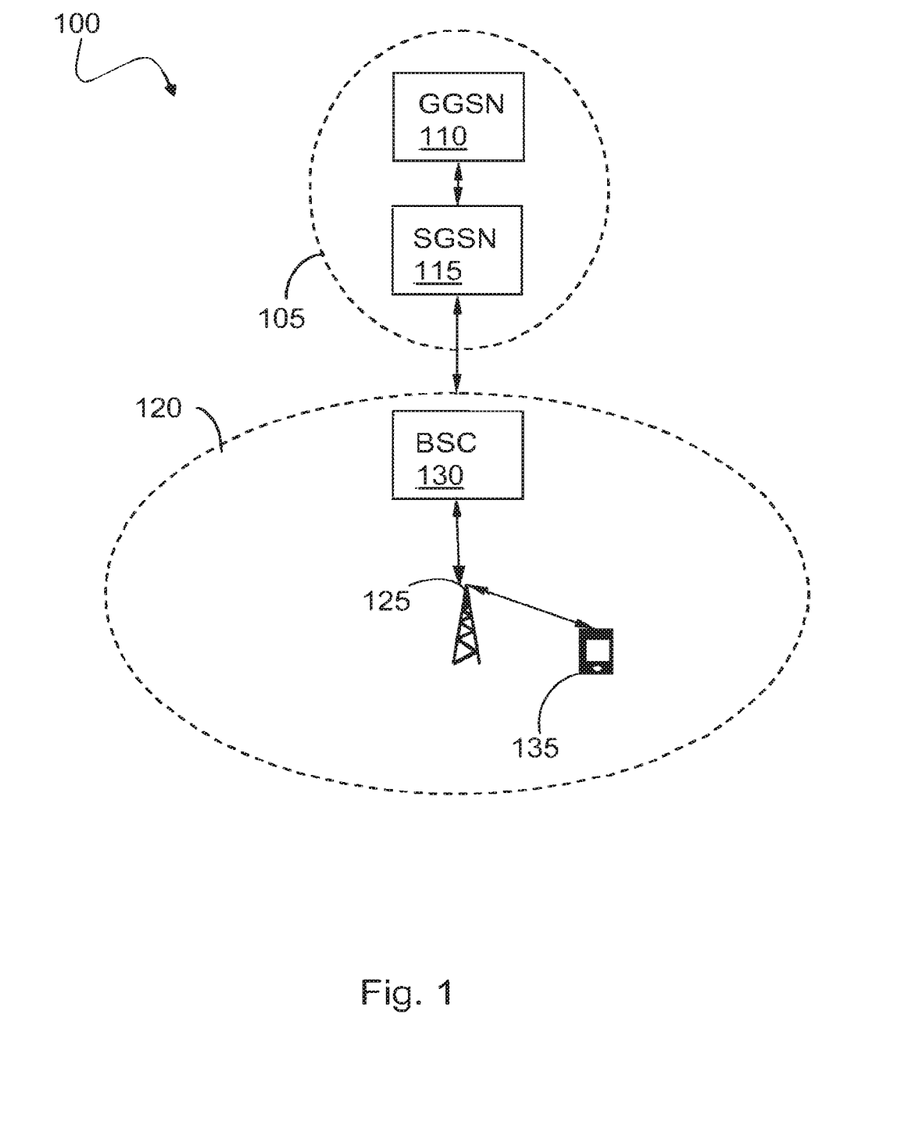
FIG. 1 is a schematic block diagram illustrating an embodiment of a telecommunications system.

FIG. 1 depicts a telecommunications system 100. The telecommunications system 100 may be for example a GSM type telecommunications system.

The telecommunications system 100 comprises a packet core network 105, sometimes also referred to as a core network. The packet core network 105 comprises a Gateway GPRS Support Node, GGSN, 110 and a Serving GPRS Support Node, SGSN, 115.

The telecommunications system 100 further comprises a radio network 120, which in this example is a base station subsystem, BSS 120. The radio network 120 may sometimes also be referred to as a radio access network.

The BSS 120 comprises base stations of which one, base station 125, is shown in the FIG. 1. The base stations are sometimes referred to as Base Transceiver Stations (BTS).

The radio network 120 also comprises a base station controller, BSC, 130 controlling one or more or more of the base stations, such as the base station 125.

In another radio network type, there may be a Radio Network Controller (RNC) instead of a BSC.

The base station 125 communicates with mobile stations, also referred to as user equipments, within its range. A mobile station is a terminal by which a subscriber can access services offered by an operator's core network. Mobile stations may be for example communication devices such as mobile telephones, cellular telephones, laptops or tablet computers, sometimes referred to as surf plates, with wireless capability. The mobile stations may be portable, pocket-storable, hand-held, computer-comprised, or vehicle-mounted mobile devices, enabled to communicate voice and/or data, via the radio access network, with another entity, such as another mobile station or a server. In the FIG. 1, one such mobile station, mobile station 135, is shown. The mobile station 135 may also be represented by a stationary device or machine that communicates via the radio network 120.

The communication involves the sending and receiving of data packets between the various nodes in the telecommunications system 100.

Figure 2:
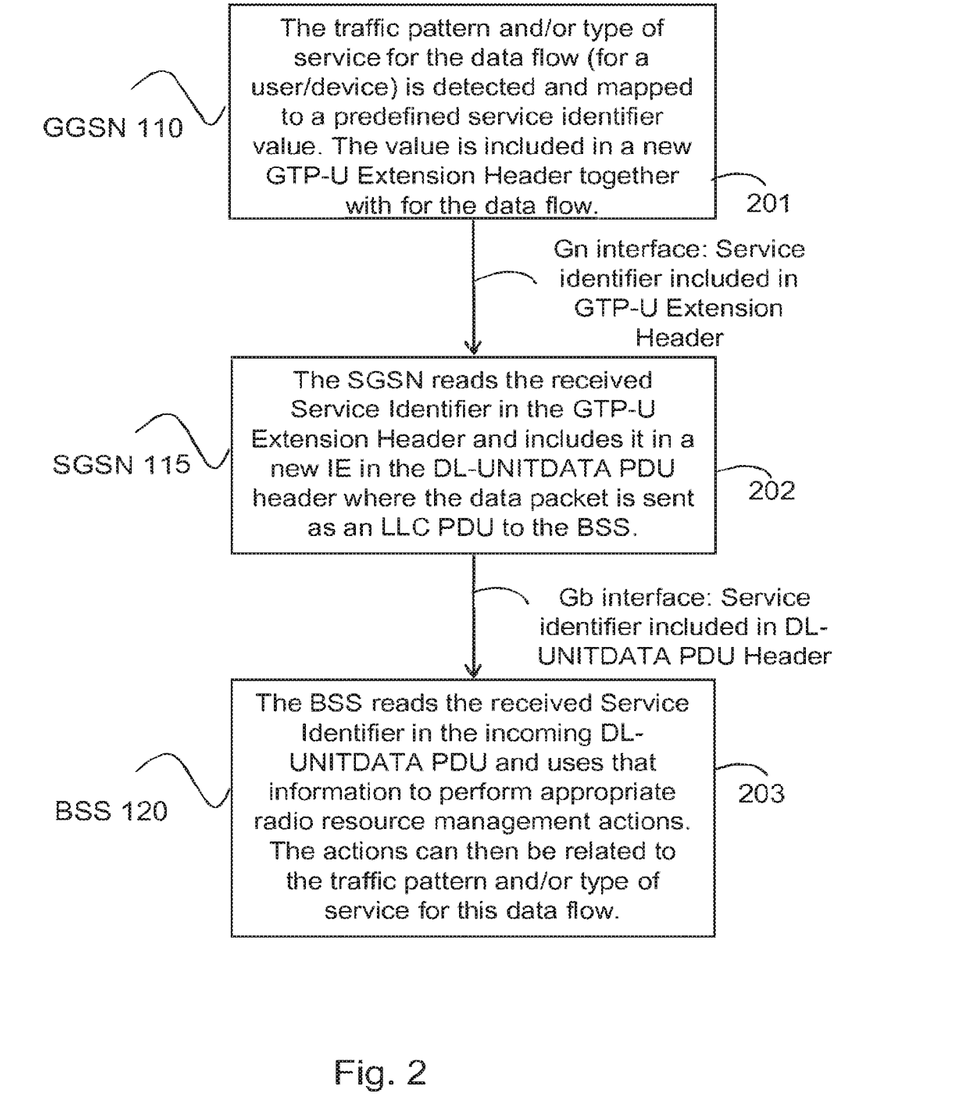
FIG. 2 is a combined signalling scheme and flowchart illustrating embodiments in a telecommunications system.

FIG. 2 illustrates how a method for transferring a service identifier from the packet core network 105 to the radio network 120 may be implemented in the telecommunications system 100 according to some embodiments herein.

The method will be further elaborated in the following.

When the GGSN 110 handles a data packet to be sent towards the SGSN 115, or the radio network 120, or the mobile station 135, it shall according to embodiments herein add information about what type of service the packet concerns, a so called service identifier, in the General packet radio service Tunneling Protocol for User Plane, GTP-U, header of the data packet.

The GGSN 110 then adds this service identifier as a header extension in the GTP-U header for the data packet, when it sends it to the SGSN 115.

Action 201 in FIG. 2 is an example of how this may be done by the GGSN 110. In this action, the traffic pattern and/or type of service for the data flow for a user or device is detected and mapped to a predefined service identifier value. The value is included in a new GTP-U Extension Header together with for the data flow.

It is thus here added a GTP-U Extension Header type to indicate what service the contained packet concerns. The GGSN 110 may retrieve information about the concerned service, or traffic pattern, in different ways e.g. by analyzing the actual data packets or their IP header.

For example, in the SGSN 115, the data is packed into Logical Link Control (LLC) Protocol Data Units (PDUs), which are sent to the BSS 120 in order to be transferred over the radio interface to the concerned mobile station 135. The information that is received in the GTP-U Extension Header about the current type of service is included in the message from the SGSN 115 to the BSS 120. It is then included in the Base Station Subsystem GPRS Protocol (BSSGP) header of the message containing the corresponding LLC PDU(s), i.e. in the DL-UNITDATA PDU(s). The DL-UNITDATA PDU is sent to the BSS 120 to transfer an LLC-PDU across the radio interface to the mobile station 135.

The DL-UNITDATA PDU may be sent over a Gb interface. This interface connects the BSS 120 and the SGSN 115 to transfer control and user plane, in the direction from the SGSN 115 to the BSS 120, that is, the service identifier is then included in a GTP-U Extension Header sent over the Gn interface.

Action 202 in FIG. 2 is an example of how this may be performed by the SGSN 115. In this action, the SGSN 115 reads the received Service Identifier in the GTP-U Extension Header and includes it in a new IE in the DL-UNITDATA PDU header where the data packet is sent as an LLC PDU to the BSS 120. The service identifier is included in the DL-UNITDATA PDU Header and sent over a Gb interface from the SGSN 115 to the BSS 120.

In action 203, the BSS 120 reads the received Service Identifier in the incoming DL-UNITDATA PDU and uses that information to perform appropriate radio resource management actions. The actions can then be related to the traffic pattern and/or type of service for this data flow.

The Service Identifier Information Element (IE) indicates the type of service that the LLC PDU included in the DL-UNITDATA PDU is related to.

The table below shows an example of a Service Identifier IE:

|  | 8 | 7 | 6 | 5 | 4 | 3 | 2 | 1 |
|---|---|---|---|---|---|---|---|---|
| octet 1 | | | | IEI | | | | |
| octet 2, 2a | | | | Length Indicator | | | | |
| octet 3 | | | | Service Identifier Value part | | | | |

The numbers 1.-8 define bit positions in the given octet. An octet is a unit of digital information comprising eight bits. IEI stands for Information Element Identifier which is a codeword that uniquely identifies a particular Information Element. Length Indicator is the number of valid octets following the Length Indicator.

The table below illustrates an example of a Service Identifier Value part coding.

| coding bits 87654321 | Semantic |
|---|---|
| 00000000 | Service type no 1 |
| 00000001 | Service type no 2 |
| ... | ... |
| 11111111 | Service type no 256 |

Service Identifier Value defines the values that can be assigned to different services/traffic patterns. As can be seen in this table, there are eight coding bit in this example, and hence 256 different service types, or values, may be coded. The term semantic may be referred to as the meaning of the coded information.

Note that the above mentioned information element is merely an example, and may in some embodiments be expanded to differentiate subscription/device information and actual service information.

The introduced information element may of course also be defined with more octets than in the above example, thus allowing more service types. For example, by using one more octet, up to 65536 service types may be supported.

To avoid that the service identifier information element is included from the SGSN 115 to a BSS 120 that does not support service identifier information, or is not making use of it, the support for this service identifier may be added to a Feature Bitmap Information. The Feature Bitmap Information is an element that indicates features supported by the BSS 120 that need to be negotiated with the SGSN 115 over the Gb interface, e.g. in an Extended Feature Bitmap IE that is exchanged between the SGSN 115 and the BSS 120 during a BVC-RESET procedure.

BVC stands for BSSGP Virtual Connection. BVCs provide communication paths between BSSGP entities. Each BVC is used in the transport of BSSGP PDUs between peer point-to-point (PTP) functional entities, peer point-to-multipoint (PTM) functional entities and peer signalling functional entities.

The BVC Reset procedure is performed to synchronise the initialisation of GPRS BVC related contexts at a BSS 120 and SGSN 115. This enables the BSS 120 and SGSN 115 to begin communication in known states. The Feature bitmap information is exchanged between the BSS 120 and the SGSN 115 when the reset is for a signalling BVC. The Feature bitmap information is sent so that each network service entity, that is BSS 120 and SGSN 115, informs what optional features it supports.

The received service identifier may then be used by the BSS 120 to perform e.g. different radio resource management mechanisms that are specific for the traffic pattern or type of service.

An advantage of embodiments herein is that they provide means for the operator to transfer explicit info about a particular service and/or traffic pattern to the BSS 120 where it can be used for specific resource management for example to improve resource utilization and/or end user experience. The indicated services may e.g. be such used for Machine Type of Communication, which will typically require a different radio resource management behavior.

Another advantage of embodiments herein is that they are not dependent of Quality of Service procedures. They may thus be used also for mobile stations that do not support the Packet Flow Identifier(s) (PFI).

Figure 3:
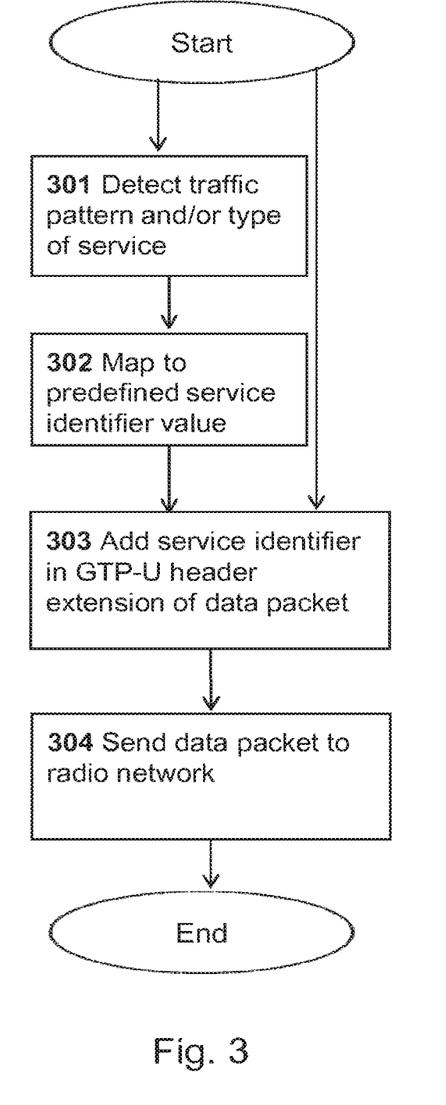
FIG. 3 is a flowchart depicting embodiments of a method in a GGSN.

Embodiments herein, relating to a method in the GGSN 110, for transferring a service identifier from the packet core network 105 to the radio network 120 will now be further elaborated and described with reference to the flowchart depicted in FIG. 3. In some embodiments, the radio network 120 is a Base Station Subsystem, BSS.

The method comprises the following actions, which actions may be taken in any suitable order.

In action 301, which is an optional action, the GGSN 110 detects the traffic pattern and/or the type of service for the data packet.

The GGSN 110 may retrieve information about the concerned service, or traffic pattern, in different ways e.g. by analyzing the actual data packets or their IP header.

In action 302, which is also optional, the GGSN 110 then maps the traffic pattern and/or the type of service to a predefined service identifier value.

In action 303, the GGSN 110 adds a service identifier in a General packet radio service Tunneling Protocol for User Plane, GTP-U, header extension of a data packet. The service identifier comprises information about what service and/or traffic pattern that the packet concerns.

In action 304, the GGSN 110 sends the data packet with the GTP-U header extension to the radio network 120.

In some embodiments, the sending is performed via a Serving General packet radio service Support Node, SGSN 115.

Since the GTP-U header extension contains the Service Identifier, the service identifier is hence transferred to the radio network.

Figure 4:
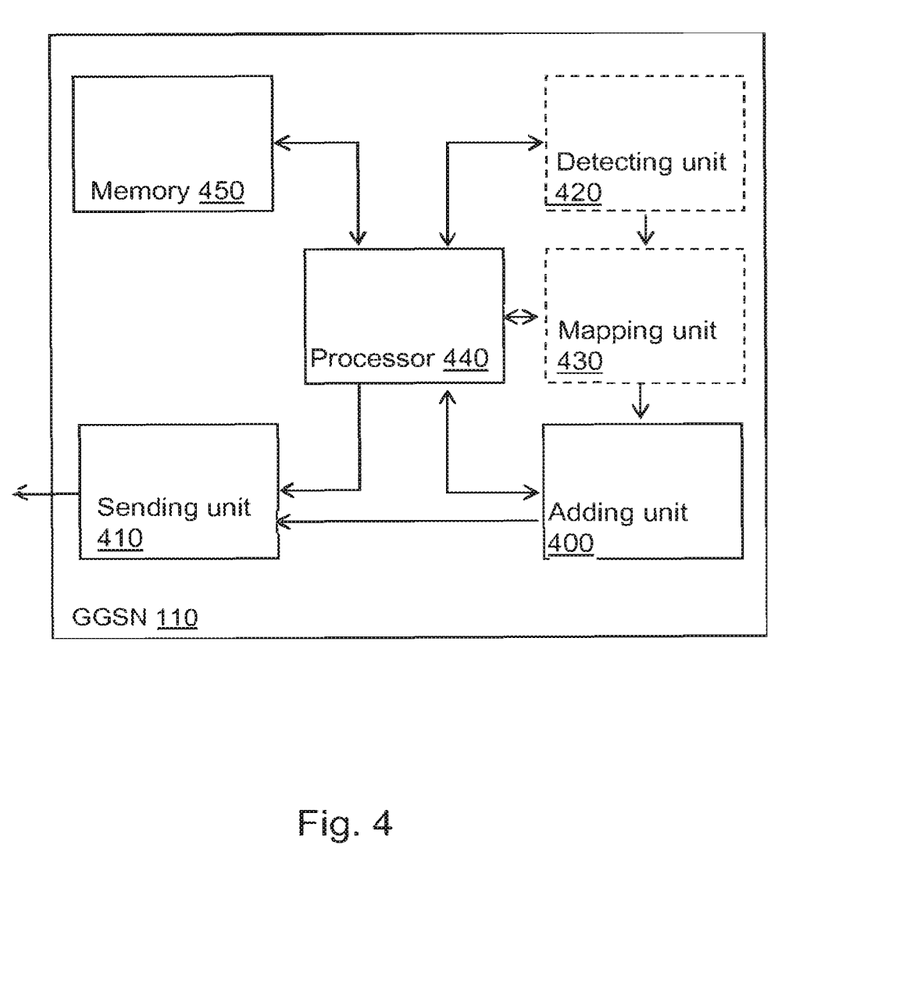
FIG. 4 is a schematic block diagram illustrating embodiments of a GGSN.

To perform the actions above for transferring a service identifier from a packet core network 105 to a radio network 120, the GGSN 110 comprises an arrangement schematically depicted in FIG. 4.

In some embodiments, the radio network 120 is a Base Station Subsystem, BSS.

The GGSN 110 comprises an adding unit 400. The adding unit 400 is configured to add a service identifier in a GTP-U header extension of a data packet. The service identifier comprises information about what service and/or traffic pattern that the packet concerns.

The GGSN 110 further comprises a sending unit 410. The sending unit 410 is configured to send the data packet with the GTP-U header extension to a radio network. In some embodiments, the sending unit 410 is configured to perform the sending via the SGSN 115.

In some embodiments, the GGSN 110 further comprises a detecting unit 420 configured to detect the traffic pattern and/or the type of service for the data packet.

In some embodiments, the GGSN 110 further comprises a mapping unit 430 configured to map the traffic pattern and/or the type of service to a predefined service identifier value.

The embodiments of the GGSN 110 for transferring a service identifier from the packet core network 105 to the radio network 120 may be implemented through one or more processors, such as a processor 440 in the GGSN 110 depicted in FIG. 4, together with computer program code for performing the actions of embodiments herein.

The program code mentioned above may also be provided as a computer program product, for instance in the form of a data carrier carrying computer program code for performing the embodiments herein when being loaded into the GGSN 110.

One such carrier may be in the form of a CD ROM disc. It is however feasible with other data carriers such as a memory stick. The computer program code may furthermore be provided as pure program code on a server and downloaded to the GGSN 110 e.g. remotely.

The GGSN 110 may further comprise a memory 450 comprising one or more memory units. The memory 450 may be arranged to be used to store data and/or applications to perform the actions of the embodiments herein when being executed in the GGSN 110.

Figure 5:
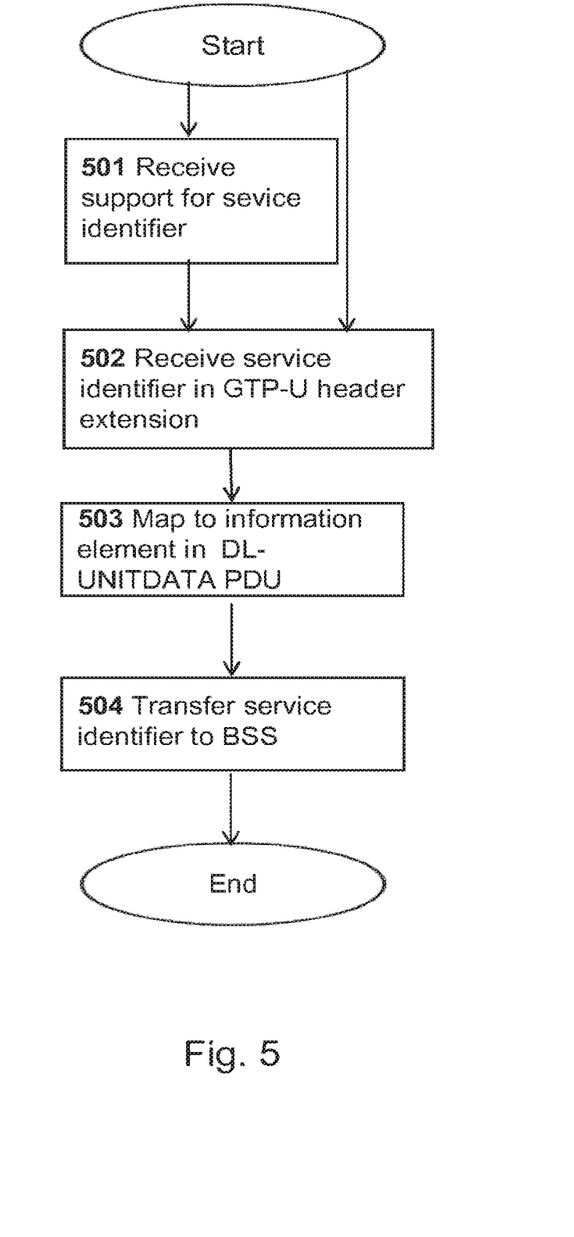
FIG. 5 is a flowchart depicting embodiments of a method in a SGSN.

Embodiments herein, relating to a method in the SGSN 115, for transferring a service identifier from a packet core network 105 to a radio network 120 will now be further elaborated and described with reference to the flowchart depicted in FIG. 5. In these embodiments, the radio network 120 is a BSS. The method comprises the following actions, which actions may be taken in any suitable order.

In action 501, which is an optional action, the SGSN 115 receives support for, i.e. information about a support for, the service identifier in a feature bitmap information that is exchanged between the SGSN 115 and the BSS 120 during a BVC-RESET procedure.

This is advantageous, since it avoids that the service identifier is included from the SGSN 115 to a BSS 120 that does not support it, or is not making use of it.

In action 502, the SGSN 115 receives the service identifier in a GTP-U header extension of a data packet from the GGSN 110. The service identifier is related to a traffic pattern and/or to a type of service for the data packet.

In action 503, the SGSN 115 maps the service identifier to an information element in DL-UNITDATA PDU of a message containing the data packet.

In some embodiments, the information element is expanded to differentiate subscription and/or device information and service information.

In action 504 the SGSN 115 transfers the service identifier in the DL-UNITDATA PDU to the BSS 120.

Figure 6:
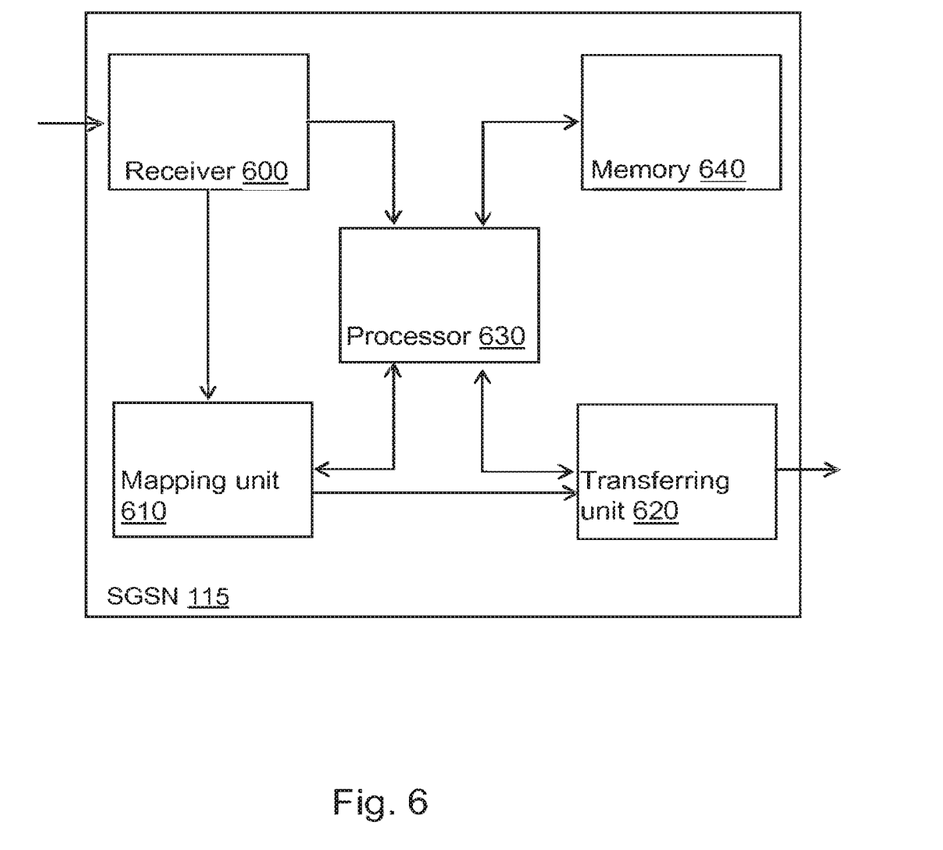
FIG. 6 is a schematic block diagram illustrating embodiments of a SGSN.

To perform the actions above for transferring a service identifier from a packet core network 105 to a radio network 120, wherein the radio network 120 is a BSS, the SGSN comprises an arrangement schematically depicted in FIG. 6.

The SGSN 115 comprises a receiver 600, configured to receive a service identifier in a GTP-U header extension of a data packet from the GGSN 110. The service identifier is related to a traffic pattern and/or to a type of service for the data packet. In some embodiments, the receiver 600 is further configured to receive a support, i.e. information about support, for the service identifier in a feature bitmap information that is exchanged between the SGSN and the BSS during a BVC-RESET procedure.

The SGSN 115 further comprises a mapping unit 610, configured to map the service identifier to an information element in a DL-UNITDATA PDU of a message containing the data packet.

The SGSN 115 further comprises a transferring unit 620, configured to transfer the service identifier in the DL-UNITDATA PDU to the BSS 120.

In some embodiments, the information element is expanded to differentiate subscription and/or device information and service information.

The embodiments of the SGSN 115 for transferring a service identifier from the packet core network 105 to the radio network 120 may be implemented through one or more processors, such as a processor 630 in the SGSN 115 depicted in FIG. 6, together with computer program code for performing the actions of embodiments herein.

The program code mentioned above may also be provided as a computer program product, for instance in the form of a data carrier carrying computer program code for performing the embodiments herein when being loaded into the SGSN 115.

One such carrier may be in the form of a CD ROM disc. It is however feasible with other data carriers such as a memory stick. The computer program code may furthermore be provided as pure program code on a server and downloaded to the SGSN 115 e.g. remotely.

The SGSN 115 may further comprise a memory 640 comprising one or more memory units. The memory 640 may be arranged to be used to store data and/or applications to perform the actions of the embodiments herein when being executed in the SGSN 115.

Figure 7:
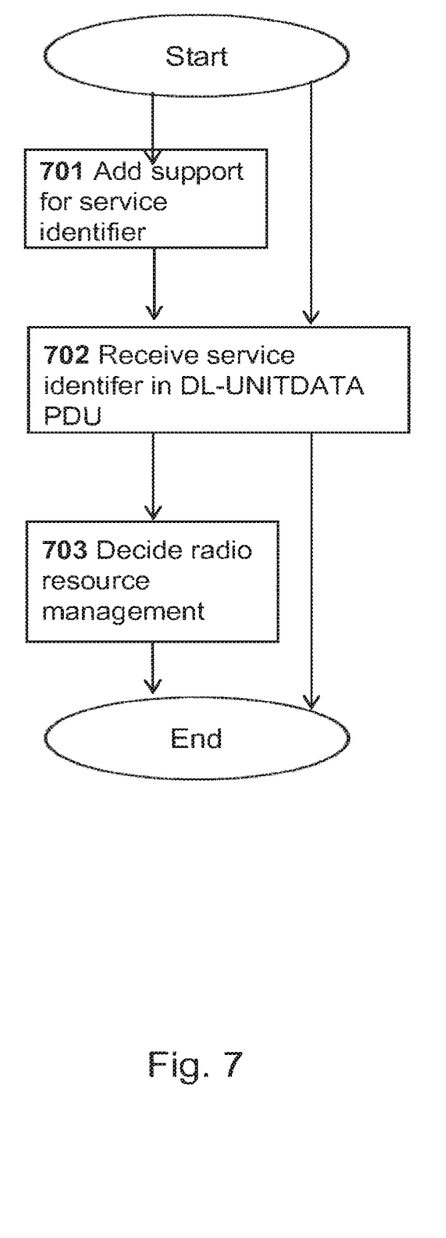
FIG. 7 is a flowchart depicting embodiments of a method in a BSS.

Embodiments herein, relating to the BSS 120 for receiving a service identifier from the packet core network 105, will now be further elaborated and described with reference to the flowchart depicted in FIG. 7. The method comprises the following actions, which actions may be taken in any suitable order.

In action 701, which is an optional action, the BSS 120 adds a support, i.e. an information about a support, for the service identifier to a feature bitmap information that is exchanged between the SGSN 115 and the BSS 120 during a BVC-RESET procedure.

This is advantageous, to avoid that the service identifier is included from the SGSN 115 to a BSS 120 that does not support it, or is making use of it.

In action 702, the BSS 120 receives a service identifier in a DL-UNITDATA PDU of a message containing a data packet from a SGSN 115. The service identifier is related to a traffic pattern and/or to a type of service for the data packet.

In action 703, which is an optional action, the BSS 120 decides a radio resource management. The deciding comprises using the received service identifier.

Figure 8:
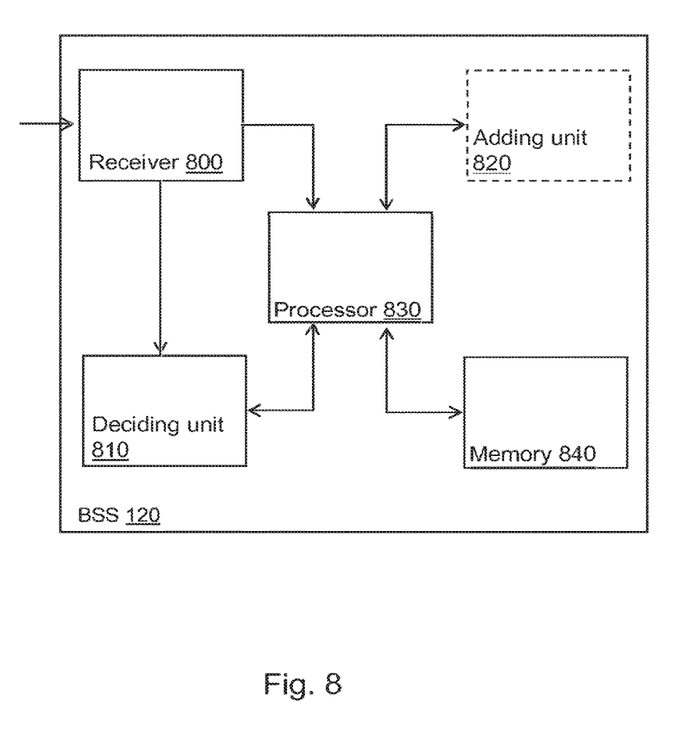
FIG. 8 is a schematic block diagram illustrating embodiments of a BSS.

To perform the actions above for receiving a service identifier from the packet core network 105, the BSS 120 comprises an arrangement schematically depicted in FIG. 8.

The BSS 120 comprises a receiver 800 configured to receive a service identifier in a DL-UNITDATA PDU of a message containing a data packet from the SGSN 115. The service identifier is related to a traffic pattern and/or to a type of service for the data packet.

The BSS 120 further comprises a deciding unit 810 configured to decide a radio resource management, which deciding comprises using the received service identifier.

In some embodiments, the BSS 120 further comprises an adding unit 820 configured to add a support for the service identifier to a feature bitmap information that is exchanged between the SGSN 115 and the BSS 120 during a BVC-RESET procedure.

The embodiments of the BSS 120 for receiving a service identifier from the packet core network 105 may be implemented through one or more processors, such as a processor 830 in the BSS 120 depicted in FIG. 8, together with computer program code for performing the actions of embodiments herein.

The program code mentioned above may also be provided as a computer program product, for instance in the form of a data carrier carrying computer program code for performing the embodiments herein when being loaded into the BSS 120.

One such carrier may be in the form of a CD ROM disc. It is however feasible with other data carriers such as a memory stick. The computer program code may furthermore be provided as pure program code on a server and downloaded to the BSS 120 e.g. remotely.

The BSS 120 may further comprise a memory 840 comprising one or more memory units. The memory 840 may be arranged to be used to store data and/or applications to perform the actions of the embodiments herein when being executed in the BSS 120.

As has been described above, it is an object of embodiments herein to provide a method and arrangement for transferring a service identifier from the packet core network 105, i.e. the GGSN 110, to a BSS 120.

This object is further achieved by a method and arrangement according to some embodiments that includes the steps of and provides means to:

transfer service identifiers in the GTP-U header extensions IE from the GGSN 110 to the SGSN 115 mapping these service identifiers in the SGSN 115 from GTP-U header extension IE into an IE added to the BSSGP protocol in the DL-UNITDATA PDU transferring the service identifiers in an IE added to the BSSGP protocol to the DL-UNITDATA PDU utilizing the service identifiers in the BSS 120 for radio resource management decisions based on internal implementation choice.

When using the word "comprise" or "comprising" it shall be interpreted as non-limiting, i.e. meaning "consist at least of".

The term "configured to" used herein may also be referred to as "arranged to".

The embodiments herein are not limited to the above described embodiments. Various alternatives, modifications and equivalents may be used. Therefore, the above embodiments should not be taken as limiting the scope of the invention, which is defined by the appending claims.

The invention claimed is:

1. A method in a Base Station Subsystem (BSS) for receiving a service identifier from a packet core network, the method comprising:

receiving a service identifier in a BSS General Packet Radio Service (GPRS) Protocol (BSSGP) Downlink unitdata Protocol Data Unit (DL-UNITDATA PDU) that includes a Logical Link Control (LLC) PDU comprising a data packet or a portion of a data packet from a Serving General packet radio service Support Node (SGSN) which service identifier is identifying a type of service for the data packet, wherein receiving the service identifier in the DL-UNITDATA PDU comprises receiving, within a header of the DL-UNITDATA PDU, a value corresponding to the service identifier; and performing an action based on the service identifier.

2. The method according to claim 1 wherein performing the action based on the service identifier comprises deciding a radio resource management using the received service identifier.

3. The method according to claim 2, further comprising performing radio resource management mechanisms that are specific to the type of service which corresponds to the received service identifier.

4. The method according to claim 2, wherein deciding a radio resource management using the received service identifier comprises determining an amount of radio resources to allocate and how long radio resources shall be kept when data flow has terminated.

5. The method according to claim 1, wherein performing the action based on the service identifier comprises adding information about support for the service identifier to a feature bitmap information that is exchanged between the SGSN and the BSS during a BSSGP Virtual Connection (BVC) BVC-RESET procedure.

6. The method according to claim 1, wherein the DL-UNITDATA PDU is transferred from the SGSN to the BSS over a Gb interface.

7. A Base Station Subsystem (BSS) node for receiving a Service Identifier from a packet core network, the BSS node comprising:

at least one processor;

a memory containing program code that when executed by the at least one processor causes the at least one processor to perform operations comprising:

receiving a service identifier in a BSS General Packet Radio Service (GPRS) Protocol (BSSGP) DownLink unitdata Protocol Data Unit (DL-UNITDATA PDU) that includes a Logical Link Control (LLC) PDU comprising a data packet or a portion of the data packet from a Serving General packet radio service Support Node (SGSN) which service identifier identifies a type of service for the data packet, wherein receiving the service identifier in the DL-UNITDATA PDU comprises receiving, within a header of the DL-UNITDATA PDU, a value corresponding to the service identifier.

8. The BSS according to claim 7, wherein the program code causes the at least one processor to perform operations comprising deciding a radio resource management using the received service identifier.

9. The BSS according to claim 8 wherein the program code causes the at least one processor to perform operations comprising performing radio resource management mechanisms that are specific to the type of service which corresponds to the received service identifier.

10. The BSS according to claim 8 wherein in deciding a radio resource management using the received service identifier, the at least one processor determines an amount of radio resources to allocate and how long radio resources shall be kept when data flow has terminated.

11. The BSS according to claim 7, wherein the program code causes the at least one processor to perform operations comprising adding information about support for the service identifier to a feature bitmap information that is exchanged between the SGSN and the BSS node during a BSSGP Virtual Connection (BVC) BVC-RESET procedure.

12. The BSS according to claim 7 wherein the DL-UNITDATA PDU is received from the SGSN over a Gb interface.

* * * * *